Figure 1:
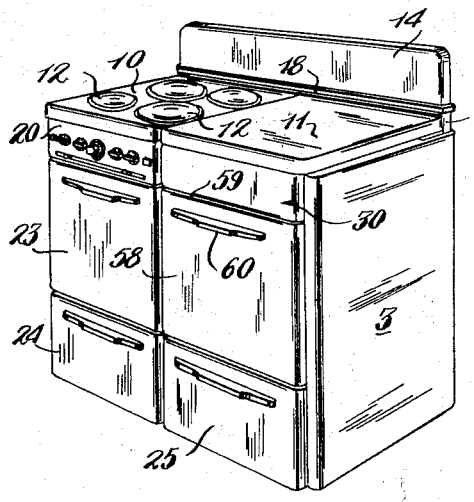
Figure 2:
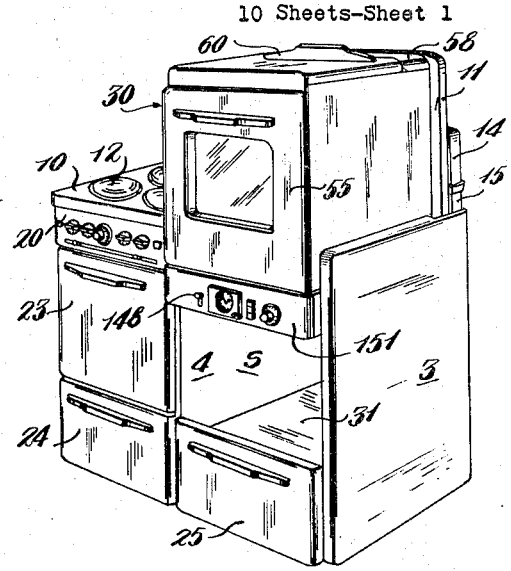
Figure 3:
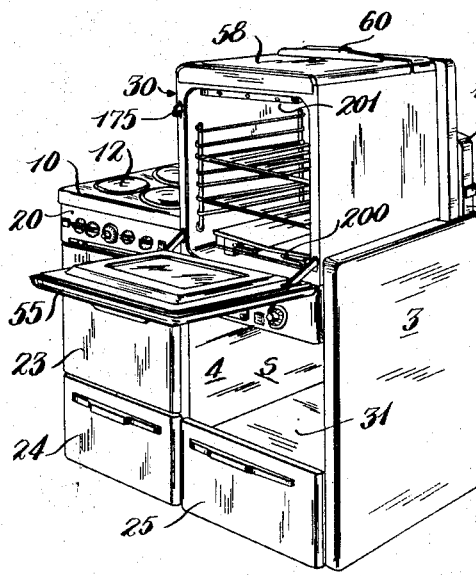
Figure 4:
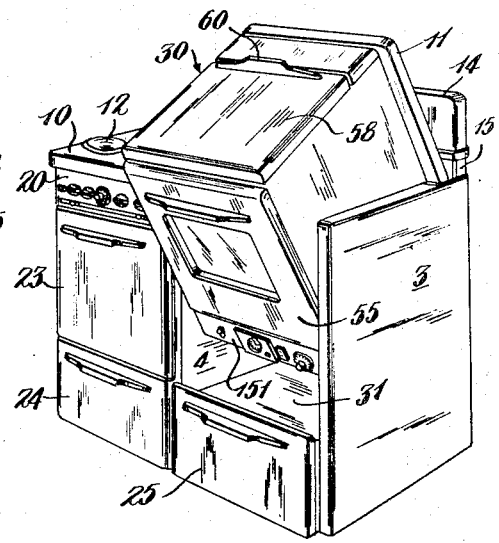

Dec. 25, 1956  L. S. CHADWICK  2,775,237
SHIFTABLE OVEN FOR COOKING STOVES OR RANGES
Filed Nov. 21, 1950  10 Sheets-Sheet 1

INVENTOR.
LEE S. CHADWICK
BY
West & Oldham
ATTORNEYS

Dec. 25, 1956  L. S. CHADWICK  2,775,237
SHIFTABLE OVEN FOR COOKING STOVES OR RANGES
Filed Nov. 21, 1950  10 Sheets-Sheet 2

INVENTOR.
LEE S. CHADWICK
BY
West Oldham
ATTORNEYS

Dec. 25, 1956

L. S. CHADWICK 2,775,237

SHIFTABLE OVEN FOR COOKING STOVES OR RANGES

Filed Nov. 21, 1950

10 Sheets-Sheet 4

INVENTOR.
BY LEE S. CHADWICK
West & Oldham
ATTORNEYS

Dec. 25, 1956     L. S. CHADWICK     2,775,237
SHIFTABLE OVEN FOR COOKING STOVES OR RANGES
Filed Nov. 21, 1950     10 Sheets-Sheet 5

INVENTOR.
LEE S. CHADWICK
BY West Oldham
ATTORNEYS

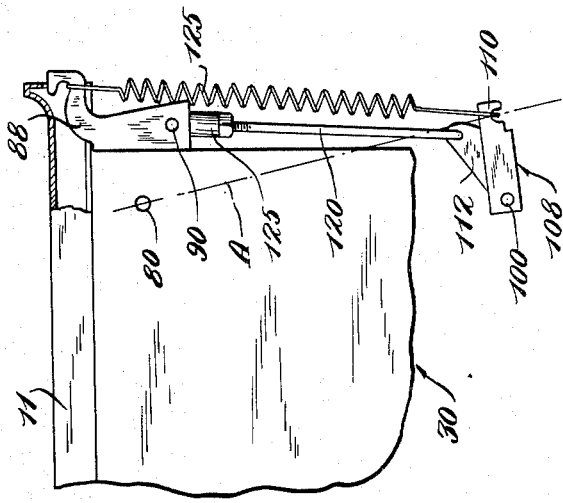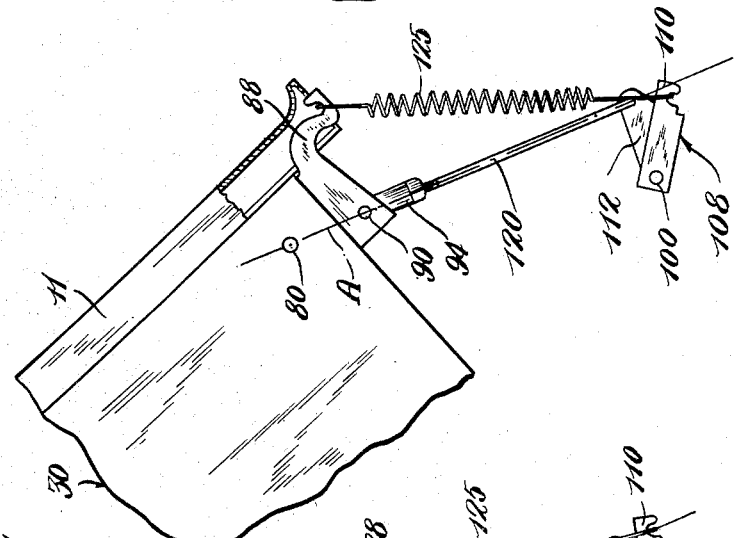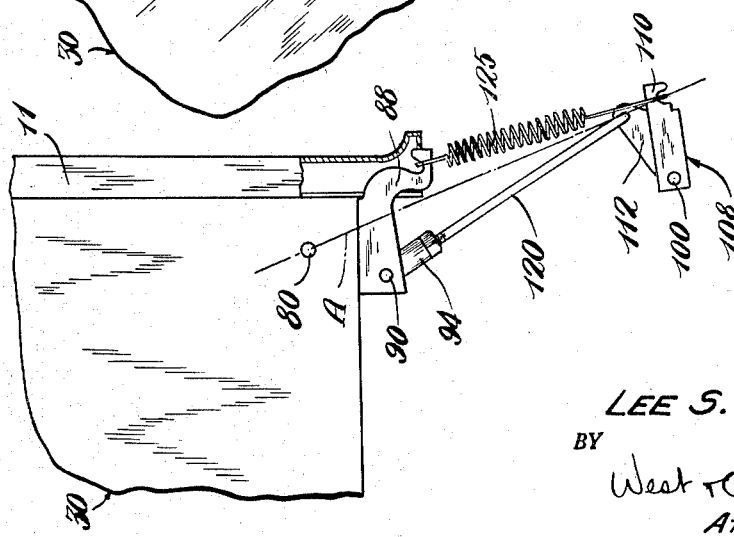

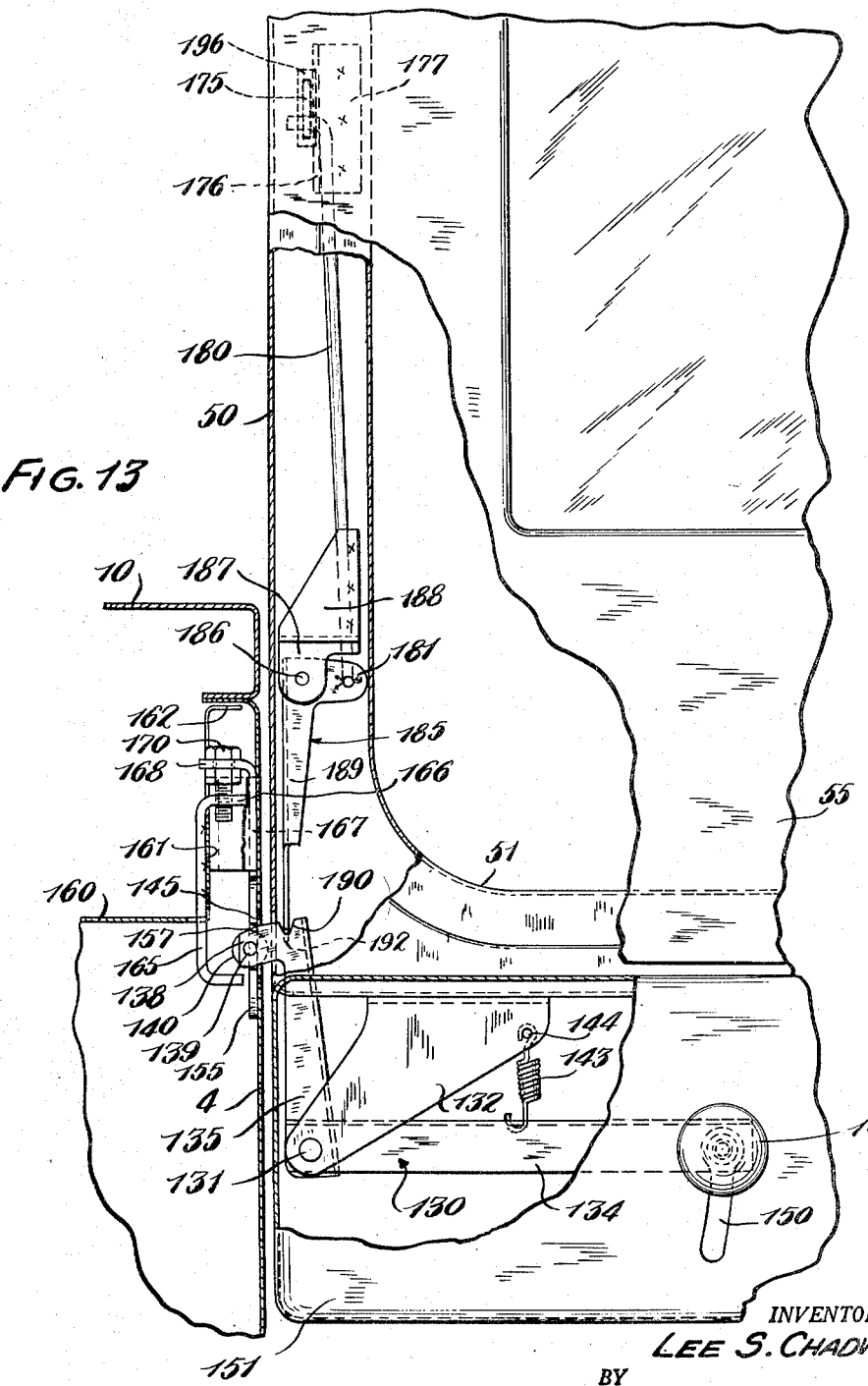

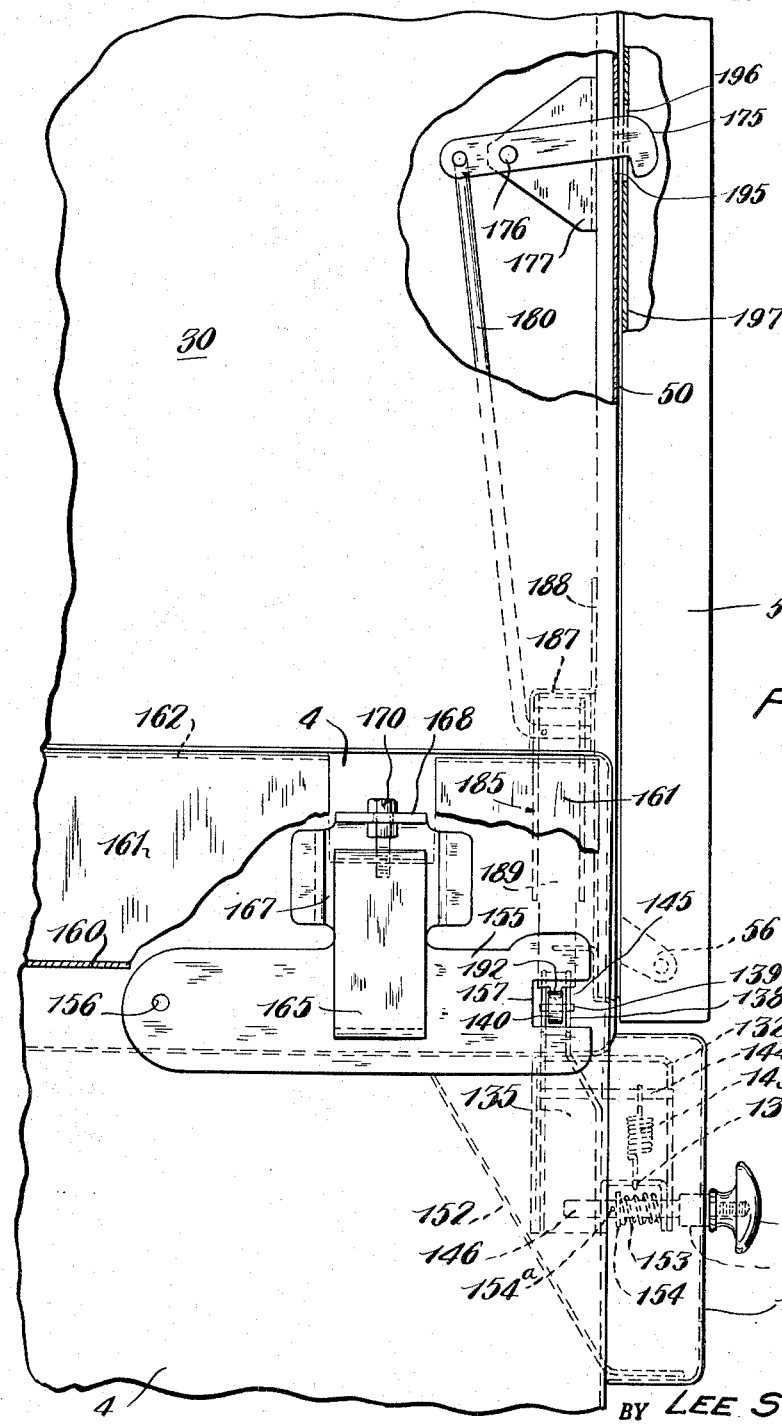

Dec. 25, 1956
L. S. CHADWICK
2,775,237
SHIFTABLE OVEN FOR COOKING STOVES OR RANGES
Filed Nov. 21, 1950
10 Sheets-Sheet 9
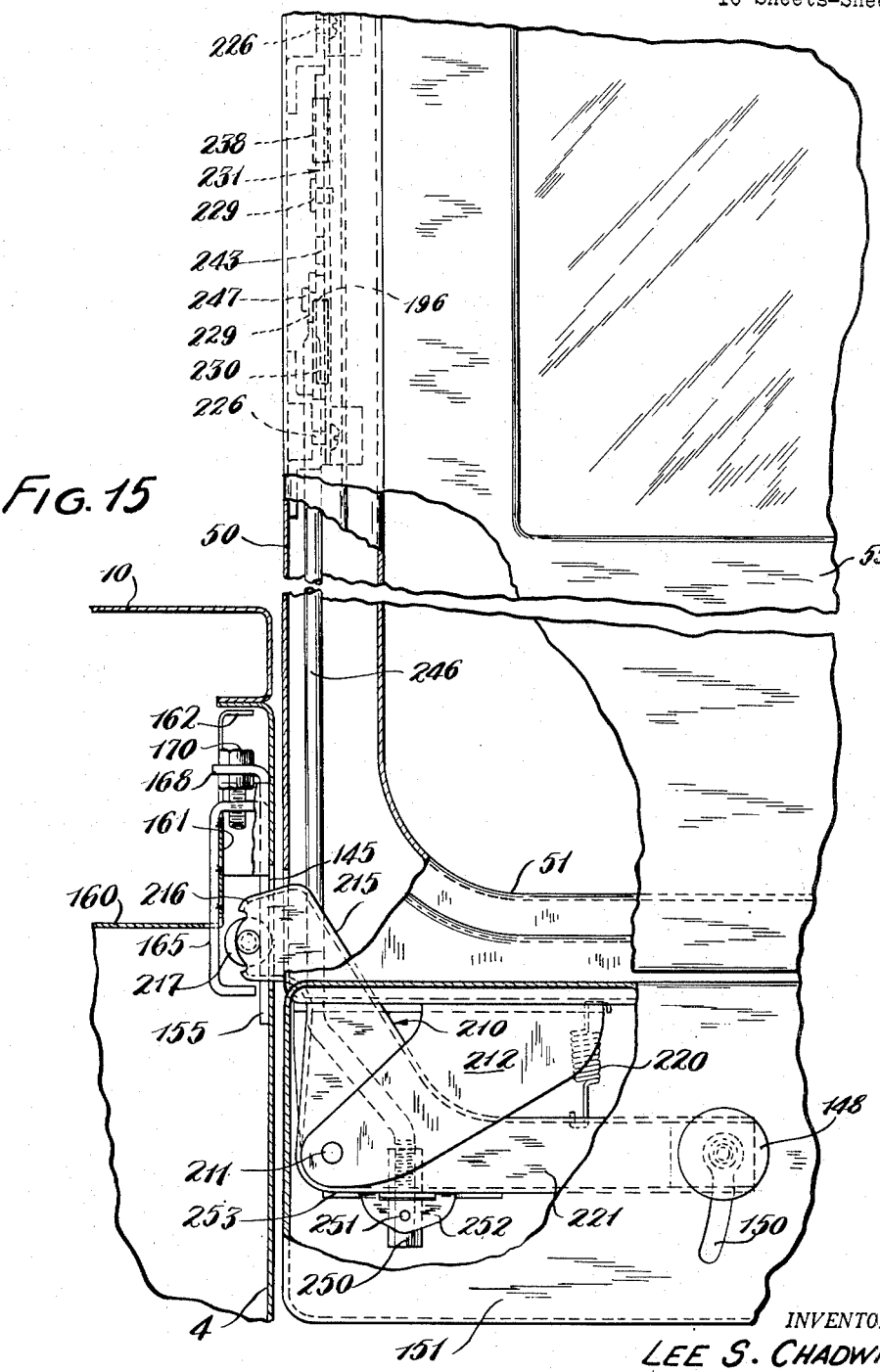
INVENTOR.
LEE S. CHADWICK
BY
West + Oldham
ATTORNEYS

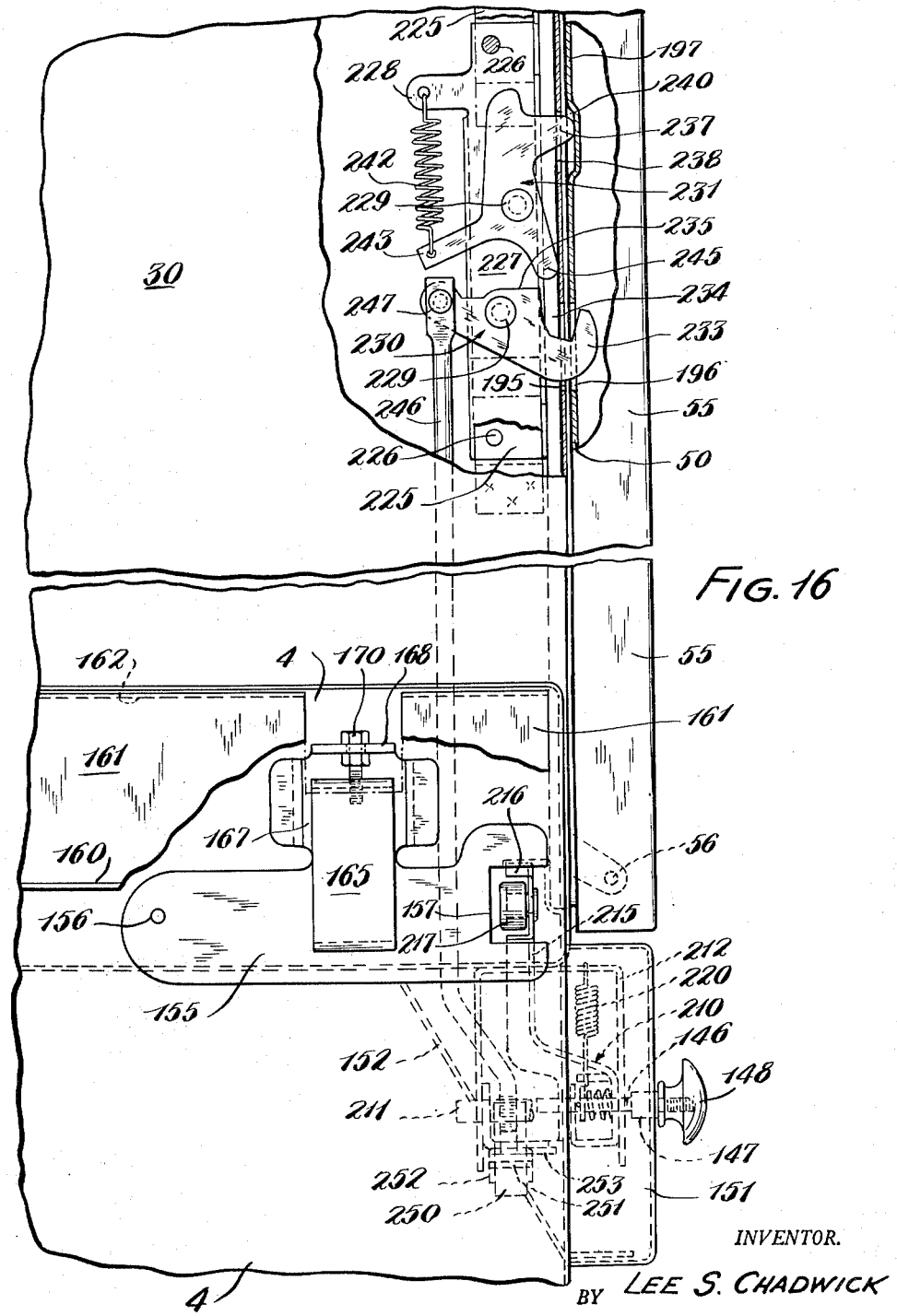

United States Patent Office 2,775,237
Patented Dec. 25, 1956

2,775,237

SHIFTABLE OVEN FOR COOKING STOVES OR RANGES

Lee S. Chadwick, Shaker Heights, Ohio, assignor, by mesne assignments, to Hupp Corporation, Detroit, Mich., a corporation of Virginia Application November 21, 1950, Serial No. 196,823

16 Claims. (Cl. 126—19)

This invention relates, generally, to the class of cooking stoves or ranges, and more particularly to a shiftable oven for incorporation in apparatus of this class.

During recent years flat top or so-called "table top" stoves or ranges have almost entirely replaced the earlier elevated oven style or model, notwithstanding the greater convenience and safety of the latter with respect to use of the ovens.

The present flat top cooking stove or range is compact, neat and attractive of appearance, harmonizes with modern kitchen equipment, and is very convenient of use insofar as the top or surface burners or heating elements are concerned because of the additional working space provided in the plane of said burners or heating elements. However, since the ovens of flat top stoves or ranges are located some distance below the stove or range top, their use has been somewhat unsafe and has required much bending, stooping and squatting, especially when attending the broiling of meats or inspecting other foods in the process of cooking.

My present invention has to do with a cooking stove or range which, in one condition for use, is of the flat top variety, affording all of the conveniences of the usual stove or range of this style, and which, in another condition for use, is of the elevated oven type, affording all of the advantages of the latter.

Therefore, the prime object of my invention is to provide, in a cooking stove or range, an oven that is so mounted as to be readily shiftable between an idle or low position (when the stove or range has the appearance and utility of one of the flat top kind) and a working or high postion (when the apparatus has the appearance and utility of a stove or range of the elevated oven variety).

Another object of my invention is to pivotally support a shiftable oven in such manner that it swings through only 90° between idle and working positions, whereby its movement is restricted to minimum compass. In a stove structure of the character herein disclosed, this permits the same to be placed with its back near a wall.

Another object is to provide a spring and compression link arrangement by which the oven is properly counterbalanced throughout its range of movement thereby to insure smooth action; make easier the swinging of the oven from one position to the other, and control the motion of the oven as it approaches either position in such manner as to urge it into a stable condition at either limit of its travel.

Another object of the invention is to provide simple and efficient latch means, that is convenient of manual release, for positively retaining the oven in working position. A further object is to provide a detent, desirably actuated by the former means, for holding the door of the shiftable oven closed excepting when said oven is in working position.

A still further object of the invention is to provide a simple, durable and relatively inexpensive shiftable oven construction, that is convenient of incorporation in a stove or range structure.

Although not limited to such, I have illustrated my invention in the accompanying drawings as incorporated in an electric cooking stove or range; and as I proceed to describe the present embodiment in detail by reference to said drawings, I wish it to be understood that the invention is susceptible to such changes and modifications as are embraced within the scope of the claims appended hereto.

Figure 5:
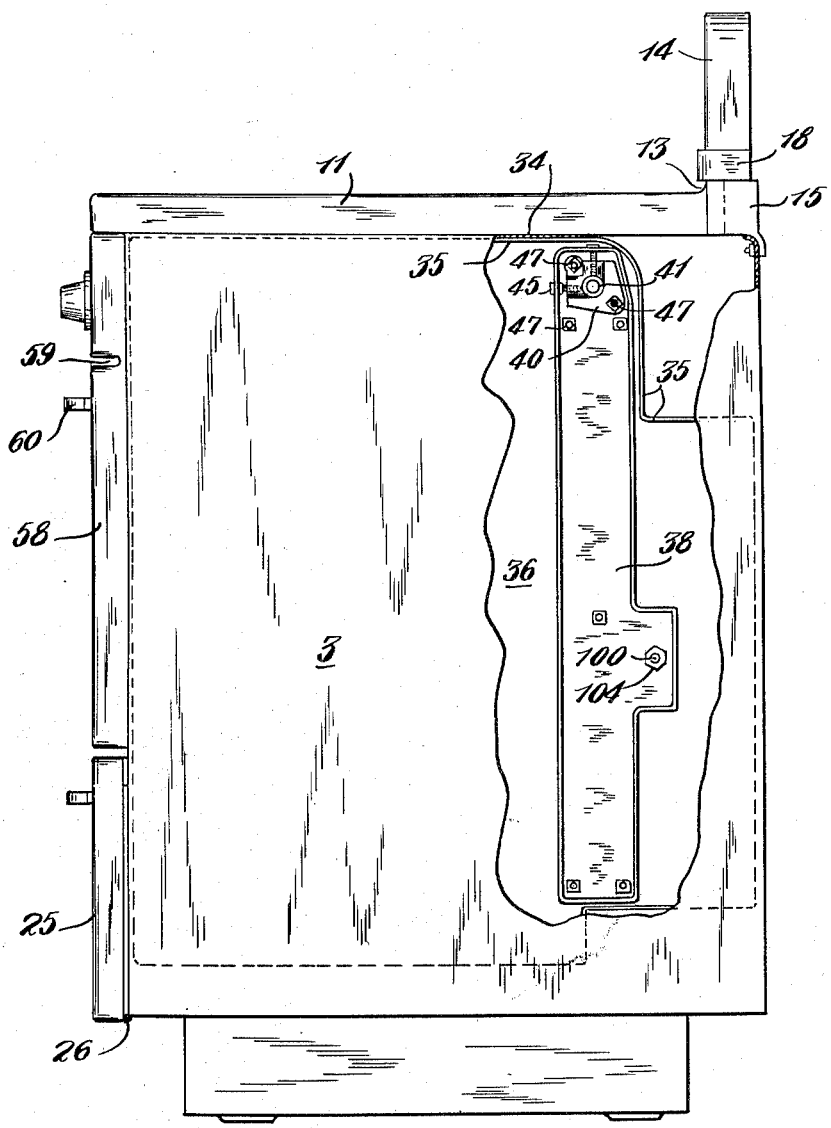
Figure 6:
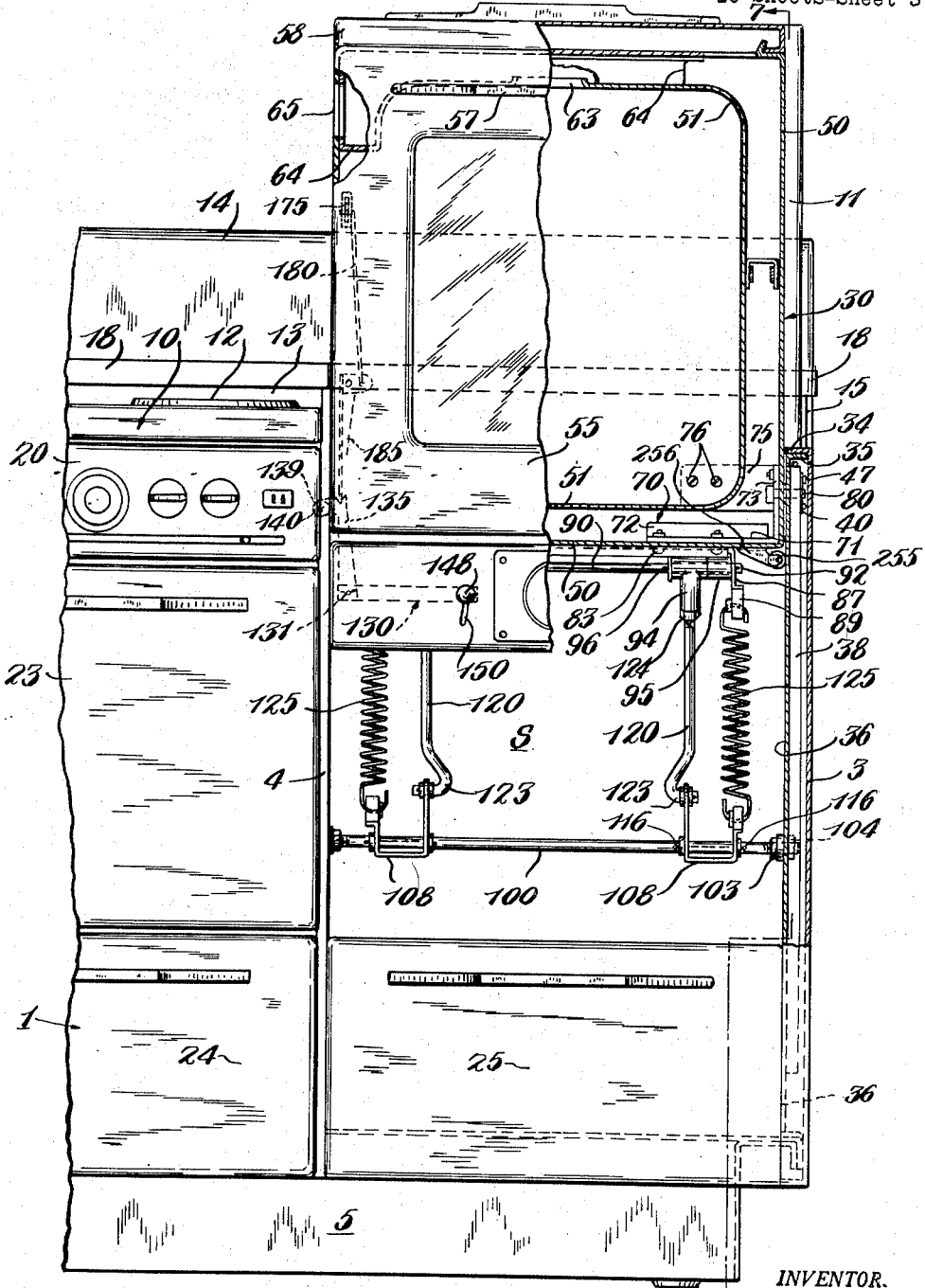
Figure 7:
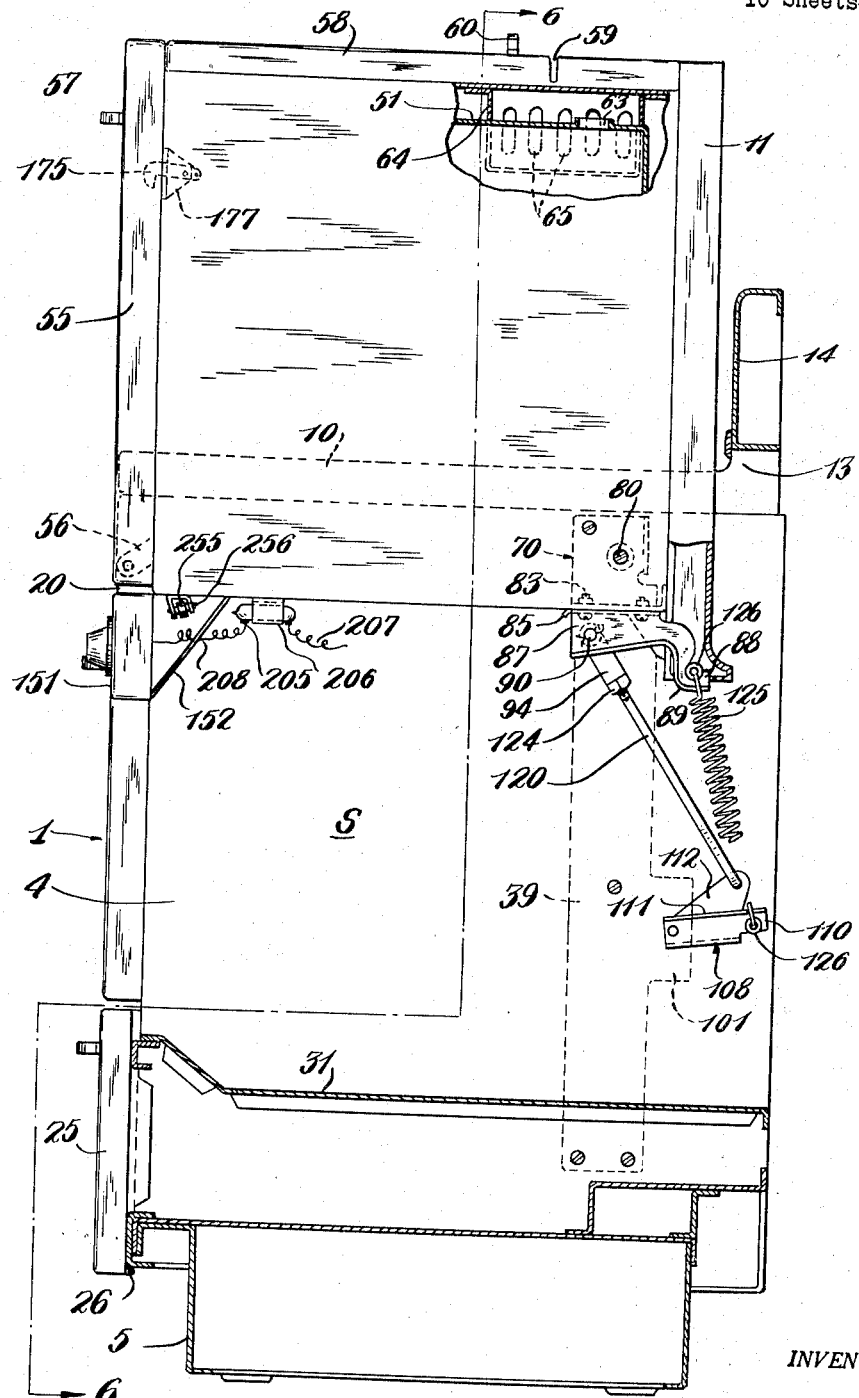
Figures 8, 9:
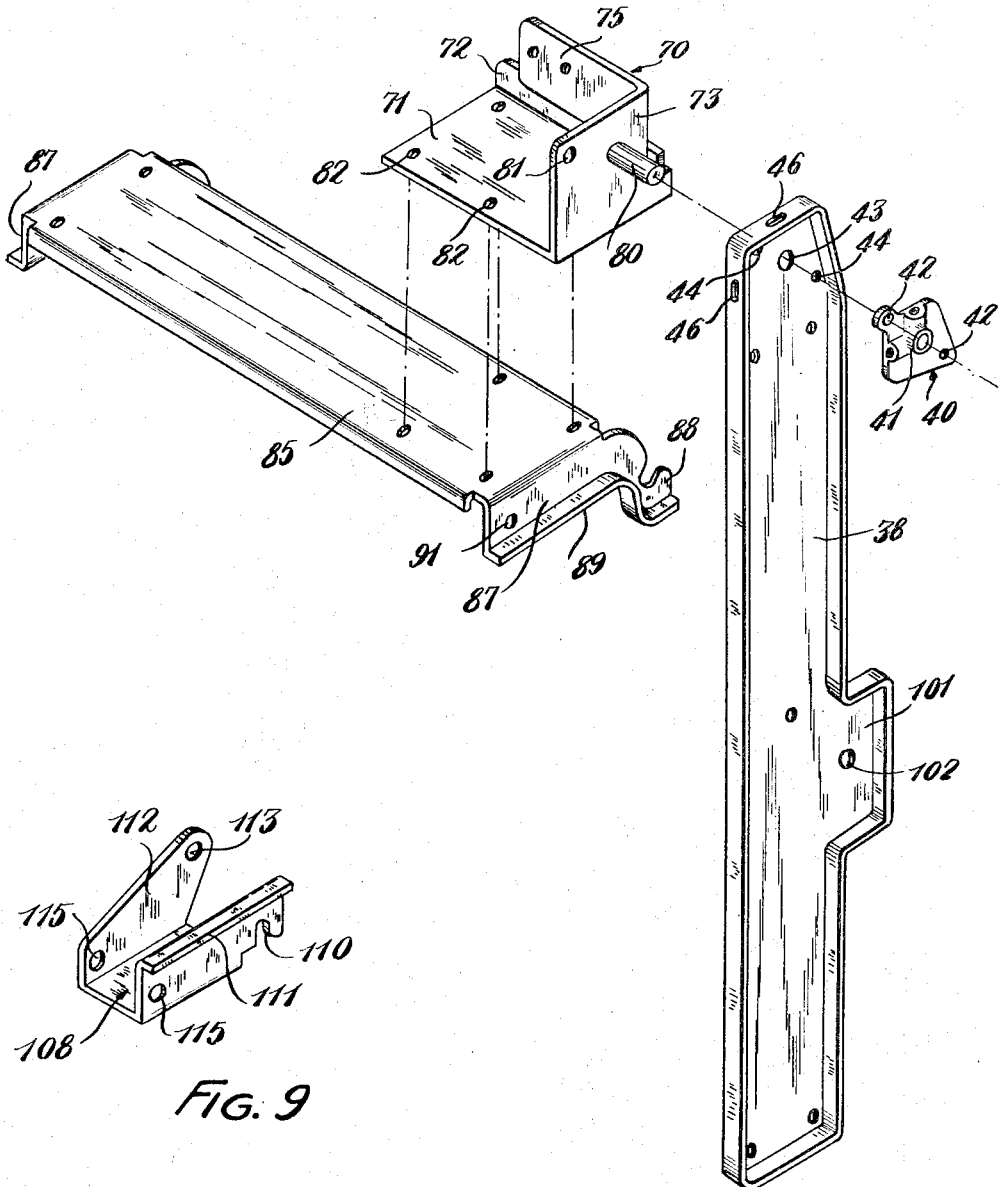

In the drawings, Figs. 1, 2, 3 and 4 are perspective views of a cooking stove or range incorporating the invention and wherein the shiftable oven is shown, respectively, in idle position; in working position; in the latter position with the oven door open, and in a position intermediate idle and working positions; Fig. 5 is a side elevational view of the stove or range with the shiftable oven in idle position and with a part of the adjacent side panel broken away; Fig. 6 is a fragmentary front elevational view of the stove or range with the shiftable oven in elevated or working position, and with the right side thereof and the adjacent portion of the stove structure shown in vertical section, the plane of section being indicated by the line 6—6 of Fig. 7; Fig. 7 is a sectional side elevational view, substantially on the line 7—7 of Fig. 6; Fig. 8 is a group of isometrics of certain parts having to do with the shiftable oven, said parts being in separated condition but the normal relation of which is indicated by the dot-and-dash lines; Fig. 9 is a perspective view of one of the spring anchorage members; Figs. 10, 11 and 12 are diagrams illustrating the respective positions assumed by the spring and compression link arrangement when the oven is in working position, an intermediate position, and idle position; Fig. 13 is a detail of the lower left hand portion of the shiftable oven and the adjacent part of the body structure of the stove or range, as viewed from the front, showing the latch means for holding the oven in fixed relation to said structure when the former is in working position, and the detent which has operative connection with said latch means and serves to retain the oven door closed when said oven is in any but working position; Fig. 14 shows the parts illustrated in Fig. 13 as viewed from the left of the former view, and Figs. 15 and 16 are views, similar to Figs. 13 and 14, respectively, of a modification of the latch means and detent.

The body structure or stationary body of the stove or range, designated generally by the reference numeral 1 in the drawings, is made up of a left panel 2, a right panel 3, and an intermediate or center panel 4, all of which are suitably secured to and rise from a base 5. The stove or range top is composed of sections 10 and 11, the former, in the present instance, constituting a cooking top since it is equipped with heating elements or so-called surface burners designated 12. The top section 10 is mounted upon and is suitably secured to the left panel 2 and intermediate or center panel 4, and surmounting and fastened to an elevated rear portion 13 of the top section 10 is a splasher back 14 that extends the full width of the body structure and has its end remote from the top section 10 supported from and connected to the right panel 3 by means of a filler 15. A molding 18 overlies and conceals the joint between the elevated rear edge portion 13 of the top section 10 and the splasher back and extends throughout the length of the latter. A panel 20 is disposed beneath the front edge of the top section 10 and extends from the panel 2 to the intermediate or central panel 4 and carries the usual controls for the heating elements or surface burners 12. Beneath the panel 20 is a door 23 that normally closes a compartment or oven, and therebelow is a space that may be used for storage purposes, and is provided with a closure 24. In accordance with common practice, the closure 24 may constitute the front of a drawer that slides within said space.

It is evident from the foregoing that the left half of the body structure constitutes a compact cabinet stove or range of more or less conventional character.

Alongside the closure 24 is one of similar size and shape, designated 25, which normally closes a storage space above the base 5 and between the panels 3 and 4. In the present instance, the closure 25 is connected along its lower edge to the body structure by hinge means 26, as shown in Figs. 5 and 7.

The shiftable oven, designated generally by the reference numeral 30, is pivotally supported in a manner presently to be described so as to swing about a horizontal axis within a space, designated S, between the panels 3 and 4 and above a horizontal partition or shield 31 that extends from one of said panels to the other and from the front to the rear of the body structure.

As will appear from Figs. 5 and 6, the right panel 3 has an inwardly directed peripheral flange 34 within which is received, throughout the greater part of its length, a similar flange 35 of a liner 36. The vertical dimension of the liner is somewhat less than that of the panel and it differs from the latter also in profile, being cut away at its upper and lower rear corners, as shown in Fig. 5. It is this liner that actually defines the right hand side of the space S within which the shiftable oven operates. The liner 36 is secured to and rises from the base 5 and is suitably fastened within the panel 3.

In accordance with prevailing practice, the stove or range is constructed of sheet metal, and inasmuch as the shiftable oven is in effect pivotally supported by the liner 36 and center panel 4, as will more fully appear hereinafter, stiffeners are applied to the sides of the liner and panel remote from the space S in order to provide the requisite rigidity. The stiffener that is attached to the liner is designated 38, and is shown in Figs. 5, 6 and 8, while the one applied to the center panel 4 appears in dotted lines in Fig. 7 and is designated 39. The stiffeners are desirably formed from sheet metal of suitable guage and are surrounded by flanges of appreciable depth. Applied to the web of each stiffener adjacent the top thereof, in inwardly spaced relation to the adjacent portions of the edge flange, are trunnion bearings, the one associated with the stiffener 38 being shown in Figs. 5, 6 and 8, where it is designated 40. The bearing incorporates a hollow boss 41, and a base having bolt holes 42. The bore of said boss is adapted to register with an opening 43, and said bolt holes with apertures 44 in the web of the stiffener. The opening and apertures of the stiffener are somewhat larger in diameter than the bore of the boss 41 and the bolt holes 42 to permit adjustment of the bearing in a manner now to be described. Within thickened portions of the base of the bearing are threaded recesses that are disposed at right angles to each other and within which are engaged adjusting screws 45 that extend through elongated openings or slots 46 in the edge flange of the stiffener, and by means of these screws the trunnion bearing may be adjusted vertically and laterally to rectify any irregularities that would adversely affect the swinging movement of the shiftable oven. When the trunnion bearing is properly adjusted, it is locked in position with respect to the stiffener by bolts 47 that are projected through apertures in the liner 36 and through the holes 42 in the base of the trunnion bearing, the bolts having nuts applied thereto, as appears in Figs. 5 and 6.

The shiftable oven 30 is composed of a rectangular sheet metal casing 50, and a sheet metal liner 51. The latter is disposed within the casing in spaced relation to all but the front wall thereof. The space between the liner and casing may be, and preferably is, filled with suitable heat insulating material, although this is omitted from the drawings for the sake of clearness. As will be readily understood by those familiar with stove construction, the liner is open at the front and is joined to the front of the casing 50 about an opening therein that corresponds in size and shape with the internal cross sectional area of the liner. A door 55 is hingedly connected adjacent its lower edge, as indicated in dotted lines at 56, to the front of the oven, in accordance with usual practice. The door is equipped with a handle 57 by which it may be swung between open and closed positions, under control of the customary springs that are incorporated in the hinge connections of the door. These features form no part of the present invention and the details thereof are accordingly omitted from the drawings.

In the following description of the shiftable oven, the terms "top," "bottom," "front" and "rear" are used as though the oven were in elevated or working position. Therefore, it may be said that the stove top section 11 is applied to the rear end of the casing 50 and actually forms the back wall thereof. The top of the shiftable oven is constituted of a panel 58 which, for appearance sake, is divided by a crevice 59 into areas corresponding to those of the control panel 20 and door 23 of the cabinet that constitutes the left side of the stove or range structure. A handle 60 is secured to the panel 58, preferably in the horizontal plane of the handle of the door 23 when the shiftable oven is in idle position, the handle 60 being used to swing the oven from one to the other of its extreme positions.

The cooking compartment of the shiftable oven is vented, through an opening 63 in the top wall of the liner 51, to a flue 64 that extends laterally and a short distance downwardly within the space between the liner and oven casing and communicates with the atmosphere through one or more openings 65 in the left casing wall, as appears in Figs. 6 and 7. These openings are concealed when the shiftable oven is in depressed or idle position.

Occupying each lower rear corner of the oven casing 50 is a trunnion mounting 70. Each mounting, as best appears from Figs. 6 and 8, comprises a base 71, from the rear edge of which rises a shallow flange 72. A trunnion carrying part 73, extends upwardly at right angles from one end of the base 71, and projecting laterally from the upper rear edge portion thereof over the base, in a plane parallel to and forwardly of that of the flange 72, is a wing 75. The rear wall of the oven liner 51 is secured to the wings 75 of the opposed trunnion mountings by bolts 76. The trunnion 80 that is carried by each of the mountings 70 consists of a headed pin, the shank of which is projected outwardly through an aperture in the part 73, and with the inner surface of which part the head of the pin is engaged and to which it is desirably welded. Each of the trunnions is journaled in one of the previously mentioned bearings 40 and extends through apertures in the intervening sheet metal parts of the structure, as will be readily understood. The part 73 of each trunnion mounting and the overlying part of the side wall of the oven casing are desirably secured together by a bolt that is extended inwardly through registering holes in said part and wall, the hole in the part 73 of the trunnion mounting being designated 81 in Fig. 8. To prevent interference of the head of such bolt which is the adjacent part of the body structure, the expedient is followed of countersinking the bolt head and the underlying portion of the oven casing wall within the hole 81, said hole being appropriately shaped to this end. The base 71 of the trunnion mounting is provided with a plurality of holes 82 that register with holes in the bottom wall of the oven casing 50 and with holes in the web of a channel-like member 85 that is applied to the underside of said wall and extends transversely of the oven adjacent the rear end thereof, the parts being secured together by bolts 83 (Fig. 6). The member 85 is a part of the spring and compression link arrangement that tends to counterbalance the shiftable oven during its swinging movement between idle and working positions. Depending from each end of the member 85 is a wall 87 that is extended rearwardly and downwardly and is shaped to provide a spring connection or hook 88. Each of said walls and the corresponding hook is stiffened by an edge flange 89.

A rod 90 is supported by the member 85 as by having its ends extended through apertures 91 in the end walls 87 of said member, and the rod may be held against endwise movement by suitable means, as by cotter pins 92 that are extended through holes in the rod outwardly of the walls 87. Applied to the rod 90 a short distance inwardly of each of the walls 87 is the tubular cross member of a T-fitting 94, a spacer 95 preferably being interposed between the same and said wall. Each fitting is held adjacent the corresponding spacer by suitable means, as by a cotter pin and washer designated 96.

Spaced a substantial distance below and somewhat to the rear of the rod 90, and arranged in parallel relation thereto, is a second rod 100. The ends of this rod are threaded and are projected freely through holes in the panel 4 and stiffener 39, and through holes in the liner 36 and stiffener 38, the hole of the latter through which said rod extends being designated 102 in Fig. 8. Applied to the threaded portion of each end of the rod 100 are nuts 103 and 104 between which are clamped the aforesaid parts through which said end extends. Mounted on the rod 100, for limited rocking movement are spring anchorage members 108, one of which is shown in perspective in Fig. 9. Each of these members includes a spring anchorage hook 110, which is stiffened by a flange 111, and an arm 112, the latter having, adjacent its free end, a bearing aperture 113. The member is provided with holes 115 through which the rod 100 extends, and the member is held in a given position lengthwise of the rod by suitable means 116, such as cotter pins and washers. The spring anchorage hook 110 and arm 112 of each member 108 are spaced apart a distance corresponding, substantially, to the spacing apart of each of the previously mentioned spring connections or hooks 88 and the stem of the adjacent T-fitting 94 that are associated with the upper rod 90; and each member 108 is desirably located with its arm 112 in substantially the vertical plane of the stem of the corresponding T-fitting. 120 denotes compression links whose lower ends are shaped to provide journals that are engaged through the bearing apertures 113 in the rear ends of the arms 112 of the members 108, said journals being held against displacement by suitable means 123 such as cotter pins and washers.

The upper end of each of said compression links 120 is threaded for the reception of an adjusting nut 124. The stem of the T-fitting 94 has a smooth bore that receives the upper end of the link. Tension springs 125 have their hooked upper ends engaged with the spring hooks or connections 88 of the member 85, and their lower hooked ends engaged within the spring anchorage hooks 110 of the members 109. Bushings 126 are desirably applied to the hooked ends of the springs and occupy the bights of the hooks 88 and 110.

Due to the action of the spring and compression link arrangement, which I shall now describe by reference particularly to Figs. 10, 11 and 12, the shiftable oven may be swung with comparative ease, by means of the handle 60, between working position and idle position. A plane including the pivotal axis of the shiftable oven, represented by the trunnions 80, and the anchored lower ends of the springs 125, is indicated in Figs. 10 to 12 by the dot-and-dash line A. Although in the present construction, as hereinbefore pointed out, there are two springs, two spring anchorage members, and two compression links, I shall, for the purpose of this description, refer to these parts in the singular. When the shiftable oven is in working position, as in Fig. 10, the spring 125 rather closely approaches the plane A. Under these circumstances the spring is shortest and accordingly at minimum tension. As will further appear from Fig. 10, the upper end of the compression link 120 is at maximum distance forwardly of the plane A. Inasmuch as both the spring and the link are connected at their lower ends to the movable spring anchorage member 108, the spring will have the effect of pulling downwardly on the rear end of the shiftable oven while at the same time, it will exert an upward thrust on the oven forwardly of the pivotal axis thereof, through the medium of the compression link 120. Therefore, the spring and link arrangement will tend to pretty well counterbalance the oven as it starts downward from working position. Thereafter, as the oven approaches and swings through its mid position and the center of gravity of the oven shifts rearwardly toward the vertical plane of said pivotal axis, the lifting effect, through the link, becomes less, and the tension of the spring greater. Thus, a proper counterbalancing of the oven is maintained. Now, when the link moves rearwardly beyond the plane A, it will tend with gradual increment toward neutralizing the increasing spring tension, finally allowing the oven to assume its lowest or idle position gently and without shock. However, it is to be remembered that the spring and compression link arrangement urges the oven into a stable condition at each end of its travel, as hereinbefore pointed out. The action above described is reversed when the shiftable oven is swung upwardly to working position.

In order to positively hold the shiftable oven in working position, I employ the latch mechanism shown in detail in Figs. 13 and 14. This mechanism includes a bell crank designated, generally, by the reference numeral 130. The bell crank is pivoted at the angle of its branches, by means of a pin 131, to a bracket 132 that is secured to and depends from the bottom wall of the casing of the shiftable oven. The bell crank 130 is fabricated of sheet metal parts, a branch 134 thereof being in the form of a downwardly opening channel. The other branch 135 is also of channel formation, but is narrower at top than bottom, as appears from Fig. 14. Adjacent the lower end of the branch 135, one of its side flanges is welded or otherwise secured to the adjacent flange of the branch 134. As will also appear from Fig. 14, the bracket 132 is U-shaped in side elevation and the beforementioned pin 131 is supported at its ends in apertures in the lower ends of the branches of said bracket and extends through aligned holes in the side flanges of the bell crank branches 134 and 135. The upper end of the latter branch is shaped to provide a hook-like part or latch nose 138 that is desirably laid off on an arc which has as its center the pivotal axis of the bell crank. The hook-like part or latch nose 138 consists of extensions of the side flanges of the branch 135 and said extensions have apertures within which are supported the ends of a pin 139 on which a roller 140 is mounted. A tension spring 143 is shown as having its upper end anchored to a pin 144 that is carried by the bracket 132, and its lower end connected to the web of the channel that constitutes the branch 134 of the bell crank 130. This spring 143, therefore, tends to rock the bell crank in a direction to project the latch nose 138 through an opening 145 in the intermediate or center panel 4 of the stove structure, when the shiftable oven is in working position. At all other times the latch nose is held retracted against the action of the spring 143 by engagement of the roller 140 with the side of the panel 4 that is adjacent the shiftable oven. To avoid marring the finish of the panel, which desirably consists of an enamel coating, the roller 140 is made of a fiber or like composition.

146 designates a plunger that extends through aligned holes in the side flanges of the branch 134 of the bell crank, adjacent the free end of said branch. This plunger has a cylindrical head 147 near its forward end and beyond which the plunger is reduced in diameter and threaded for the mounting of a knob 148.

When the shiftable oven is in working position, with the nose 138 of the latch mechanism projected through the opening 145 of the panel 4, the head 147 of the plunger 146 occupies the enlarged upper end of a keyhole slot 150 in the front of a sheet metal panel 151 that is supported below and forwardly of the shiftable oven, as by means of brackets 152. The panel includes a rearwardly extending peripheral flange and supports the controls for the shiftable oven. The plunger 146 is urged rearwardly by a spring 153 that surrounds the plunger and is compressed between the front flange of the bell crank branch 134 and an abutment provided by a washer 154 that surrounds the plunger and is held in place thereon by a pin 154ᵃ. It will be seen, therefore, that the plunger may be grasped by the knob 148 and pulled forwardly against the tension of the spring 153 to withdraw the head 147 from the enlarged upper end of the slot 150, after which, by depressing the knob 148, the bell crank may be rocked in a direction to withdraw the latch nose 138 from the opening 145, thereby to release the shiftable oven. During this rocking of the bell crank, the portion of the plunger 146, adjacent the head 147 thereof, rides within the arcuate lower portion of the slot 150, which is substantially concentric with the pivotal axis of the bell crank and is of a width slightly greater than the diameter of the plunger.

A striker plate 155 is pivotally connected to the reverse side of the panel 4 in face contact therewith and has a notch 157 that registers with the opening 145 in the panel. The vertical dimension of the notch 157 is such as will permit the notch to receive the nose 138 of the latch mechanism with only slight clearance. Therefore, it is essential that the striker plate be accurately adjusted with regard to the working position of the oven. This is accomplished in a manner which I shall now explain.

A sheet metal plate 160 is incorporated in the cabinet that constitutes the left side of the stove or range structure. Along its right side, said plate 160 is extended upwardly to provide a wall 161 that is spaced from and is parallel to the adjacent portion of the panel 4. At its upper end the wall 161 has a flange 162 that fits beneath the top flange of said panel. 165 designates a U-shaped hanger that is provided with top and bottom flanges, the former being denoted 166. This hanger is engaged through cut-away portions of the plate 160 and wall 161 and is secured to the latter, preferably by welding. The striker plate 155 includes a vertical branch 167 that is in opposed relation to the hanger 165 and has its upper end turned laterally to provide a flange 168 that is spaced above the flange 166 of the hanger. 170 denotes an adjusting screw that is swiveled in the flange 168 and is threadedly engaged within a hole in the flange 166. Accordingly, by means of the screw 170, the elevation of the free end of the striker plate 155 may be varied for the purpose aforesaid.

To prevent the door of the shiftable oven from swinging open under the influence of gravity when the oven is in any but working position, a detent 175 is provided. This detent is in the form of a hook that is pivoted intermediate its ends on a pin 176, carried by a bracket 177 that is secured to the inner side of the front wall of the oven casing, adjacent the left side thereof and a substantial distance above the previously described latch mechanism. The rear end of the detent 175 is connected, by a link 180 to a short branch 181 of an L-shaped lever designated, generally, by the reference number 185. Said lever is pivoted on a pin 186 that is carried by a bracket 187, the base 188 of which is welded or otherwise secured to the front wall of the oven casing. Laterally spaced parts on the lower end of the longer branch 189 of the L-shaped lever 185 occupy V-notches 190 in the side flanges of the upper end of the branch 135 of the bell crank 130, thus operatively connecting the latch mechanism with the detent. A central tongue 192 of the branch 189 reposes within the space between the side flanges of the branch 135, thereby to maintain said branches in operative relation to each other.

The detent 175 operates within a slot 195 in the front wall of the oven casing and, when the oven door is closed, the hooked forward end of the detent occupies a slot 196 in the door liner 197. Also, when the door is closed, and the latch mechanism is in the position illustrated in Figs. 13 and 14, the detent is retained in ineffective position so that the oven door may be opened and closed at will. When the latch mechanism is operated by the knob 148 in the manner previously described to withdraw the latch nose 138 from the opening 145 in the panel 4, it will rock the L-shaped lever in a direction to shift the detent 175 to effective position so that the hooked end thereof is engaged with the inner side of the door liner 197 below the slot 196 so as to hold the oven door closed.

It will be seen therefore, that just as soon as the latch mechanism is operated to release the shiftable oven, the detent becomes effective to maintain the oven door closed, and it will be understood from what has already been said that this condition prevails at all times the shiftable oven is in any but working position.

The shiftable oven is shown as equipped with electrical heating elements 200 and 201, the former being located in the bottom of the oven and the latter adjacent the top where it serves for broiling purposes. As a safeguard against these elements inadvertently being left energized when the shiftable oven is lowered to idle position, means may be included for automatically shutting off the supply of current to said elements under such conditions. In the present instance, a mercury switch 205 is shown, more or less diagrammatically in Fig. 7, as attached by a clip 206 to the bottom of the oven casing. It will be understood that this switch is in the circuit of the heating elements 200 and 201, and current is carried to and from this switch through the respective conductors 207 and 208. As well known to those skilled in the art, a mercury switch consists of a capsule of suitable insulating material partially filled with a quantity of mercury. According to the design of the one shown, the terminals of the conductors 207 and 208 are enclosed within the capsule in spaced relation to each other and are bridged by the mercury when the capsule is in horizontal position, in which position it reposes when the shiftable oven is in working position. When the oven is swung from said position the mercury gravitates to the lower end of the capsule and thus breaks the electrical connection between the terminals of the two conductors.

In case gas is employed as the heating medium, and gas burners are substituted for the electrical heating means herein disclosed, the gas will be conducted to the burners of the shiftable oven through conduit means that will yield to the movement of said oven, the well-known expedient of a flexible conduit or a rotary joint being employed. In either event a valve is included in the conduit means that is open only when the oven is in working position and is automatically closed when the oven is moved from such position.

Figs. 15 and 16 show a modification of the combined latch means and detent that serve, respectively, to positively hold the shiftable oven in working position, and to retain the oven door closed when the oven is in any but said position; and included in this modification is an additional feature to those possessed by the previously described form that prevents the shiftable oven from being unlatched unless the oven door is fully closed. The stove parts appearing in Figs. 15 and 16 will be designated by the same reference numerals as those used in the previous views, and the latch elements that remain unchanged in the modification will be referred to by the same numerals as are used in Figs. 13 and 14.

The bell crank employed in the modified form of the latch and designated 210, is a one-piece sheet metal element pivotally supported, through a pin 211, from a bracket 212. This bracket, generally of the shape of the former one designated 132, is secured to the bottom of the oven casing 50. The upper end of the vertical branch 215 of the bell crank lever is formed to provide a latch nose 216, equipped with a roller 217 that bears against the outer side of the center panel 4 of the stove structure at all times the shiftable oven is in any but working position, the roller traversing said panel during the shifting of the oven. A tension spring 220, which has one of its ends anchored to the bracket 212 and its opposite end connected to the horizontal branch 221 of the bell crank lever, tends to rock said lever in a direction to project the latch nose 216 through the slot 145, in the panel 4, for engagement within the notch of the striker plate 155. Adjacent its free end, the branch 221 is equipped with a spring retracted plunger, identical with that designated 146 in the previous form of the mechanism, the outer end of the plunger operating in the slot 150 of the panel 151 and being equipped with an operating knob 148.

Now, with reference to the detent for retaining the oven door closed, mountings 225 are fastened to the side wall of the oven casing adjacent the front thereof, and to these mountings is secured, by bolts 226, an elongated plate 227 having, adjacent its upper end, a rearwardly extending arm 228. Pivotally connected to the plate 227, by shouldered rivets or the like 229, are a detent 230 and an obstructer 231. The detent 230 is formed at its forward end with an upwardly directed hook 233 that is set off from the body portion of the detent, on the upper side of the latter, by a notch 234. The top of the detent, immediately to the rear of said notch, constitutes an abutment designated 235. The obstructer 231 includes a projection 237 that extends through a slot 238 in the front wall of the oven casing 50, and is accommodated by a depression 240 in the liner 197 of the oven door 55 when said door is in closed, or nearly closed position. A tension spring 242 has its upper end anchored to the arm 228 and its lower end connected to a rearwardly extending arm 243 of the obstructer 231 and tends to rotate the obstructer in a clockwise direction, as the parts are viewed in Fig. 16, until the obstructer is stopped by the engagement of its upper end with the front wall of the oven casing above the slot 238. Such movement of the obstructer also disposes a foot 245 thereof over and in close proximity to the abutment 235 of the detent 230.

It is evident from the foregoing that when the oven door is completely closed, as shown in Fig. 16, the bottom wall of the depression 240 will engage the projection 237 and hold the obstructer 231 in ineffective position against the action of the spring 242 with the foot 245 thereof in vertical alignment with the notch 234 of the detent, thereby permitting the detent to be rocked in a direction to elevate its hooked forward end and dispose it in holding relation to the portion of the door lining above the slot 196. It may here be explained that the purpose of the depression 240 in the liner of the oven door is to permit the projection 237 to be of greater length and consequently to extend further through the slot 238 of the front wall of the oven casing 50 than would be the case if the liner were not depressed. This avoids any possibility of the obstructer being rendered inoperative by the projection 237 being completely retracted through the slot 238 and accidentally engaged with the inner side of said casing wall, a condition which might result from a slamming shut of the oven door.

A connecting rod 246 has its upper end pivotally connected, by means of a headed pin 247, to the rear end of the detent 230. Adjacent its lower end, said rod is passed through an opening in the bottom of the oven casing and is offset laterally and forwardly to align it with an elongated adjusting nut 250 that is threaded onto the rod. This nut is pivoted on a pin 251 that is removably supported by and between opposed flanges 252 of a member 253 that is secured to the underside of the bell crank lever, the base of said member and the overlying portion of the bottom flange of said lever having registering openings through which the nut 250 extends and which are large enough to permit the necessary swinging movement of the bell crank lever relative to the nut. In this manner an operative connection is made between the bell crank lever and the detent 230, and by virtue of the threaded connection between the nut and the connecting rod 246, the parts may be accurately adjusted to insure proper relation between the hooked end of the detent and the slot 196 in the liner of the oven door.

It is evident from the construction described above that the oven door has to be fully closed and the obstructer 231 held thereby in ineffective position before the oven latch can be released as, otherwise, the leg 245 of the obstructer would be disposed over the abutment 235 of the detent, blocking movement of both the detent and the bell crank 210.

At all times the shiftable oven is not in working position, a lateral thrust is imposed thereon by the spring action of the latch mechanism. To prevent any possibility of the oven scraping against the liner of the right hand panel 3 of the stove structure as a result of such lateral thrust, I desirably provide a roller 255 that is adapted to bear against said liner and is carried by a bracket 256 that is suitably secured to the bottom wall of the oven casing 50 adjacent the front thereof (Figs. 6 and 7).

Having thus described my invention, what I claim is:

1. In apparatus of the class described, a stationary body, an oven pivoted thereto so as to swing about a horizontal axis eccentric to the center of gravity of the oven between an idle position and a working position, a tension spring operatively connected at one end to the oven, a spring anchorage member having a sustaining connection with the body and movable with respect to the body and to which the oppsoite end of the spring is anchored, the connection between the first mentioned end of the spring and the oven being at all times on one side of a plane including the aforesaid axis and the anchored end of the spring, a part on and movable with the oven, and a compression element interposed between said part and said member, the end of the element adjacent said part swinging through the aforesaid plane during the movement of the oven from one position to the other.

2. Apparatus according to claim 1, wherein said compression element is adjustable in length to vary the mean tension of the spring.

3. In apparatus of the class described, a stationary body, an oven pivoted thereto for swinging movement about a horizontal axis eccentric to the center of gravity of the oven between an idle position and a working position, spring connections adjacent the sides of the oven rearwardly of the vertical plane of said axis, two spring anchorage members, means pivotally connecting each of said members to the body a substantial distance below one of the aforesaid spring connections, two tension springs, each having one of its ends attached to one of said spring connections and its opposite end anchored to the corresponding one of the aforesaid spring anchorage members, and two compression elements, each having its lower end pivoted to one of said anchorage members in the vicinity of the anchored end of the corresponding spring, means pivotally connecting the opposite end of each of said compression elements to the oven a substantial distance forwardly of the corresponding spring connection as when the oven is in working position.

4. Apparatus according to claim 3, wherein said compression elements are adjustable in length to vary the mean tension of the springs.

5. In apparatus of the class described, a body structure, an oven pivoted thereto for swinging movement about a horizontal axis between an idle position and a working position, an elongated member secured to the oven in parallel spaced relation to said axis, said member having, adjacent each end thereof, a laterally extending arm, a rod sustained by said member in substantially parallel relation thereto, a second rod carried by the body structure a substantial distance below and in approximately parallel relation to the first mentioned rod, two spring anchorage members, each of which is pivotally mounted on the second mentioned rod in substantially the vertical plane of one of the aforesaid arms, two tension springs, each having one of its ends connected to the end portion of one of the aforesaid arms and its opposite end anchored to the corresponding one of the aforesaid spring anchorage members, and two compression elements, each having its lower end pivoted to one of said anchorage members in the vicinity of the anchored end of the corresponding spring and its opposite end pivotally connected to the first mentioned rod in substantially the vertical plane of its lower end.

6. Apparatus according to claim 5, wherein said compression elements are adjustable in length to vary the mean tension of the springs.

7. In apparatus of the class described, a rectangular sheet metal oven, trunnion mountings fixed within the lower rear corners thereof, trunnions projecting laterally from said mountings through the plane of the sides of the oven, a body structure including laterally spaced sheet metal elements disposed in substantially parallel vertical planes and between which said oven is disposed and having apertures through which said trunnions extend, bearings supported on the sides of said sheet metal elements remote from the oven and wherein said trunnions are journalled, spring connecting means engaged with the underside of the oven adjacent the lower rear corners of the latter, fastening means extending through the plane of the oven bottom and securing the trunnion mountings and spring connecting means in place, a rod supported by and between the aforesaid sheet metal elements a substantial distance below said spring connecting means, spring anchorage members mounted on said rod for limited rocking movement, tension springs having their upper ends attached to the spring connecting means and their lower ends anchored to said anchorage members, and compression elements pivoted at their lower ends to the anchorage members and at their upper ends to said spring connecting means a substantial distance forwardly of the corresponding ends of the springs.

8. Apparatus comprising the combination and arrangement of parts defined by claim 7, and stiffeners applied to said sheet metal elements, said sheet metal elements and stiffeners having apertures through which the ends of said rod are engaged.

9. In apparatus of the class described, a body structure, an oven pivoted thereto for swinging movement about a horizontal axis between an idle position and a working position, the oven having a hinged door, a detent for holding the door closed, means retaining the detent in door holding condition when the oven is in any but working position, and further means acting automatically to render the detent ineffective and retain it in ineffective condition thereby to release the door when the oven is in working position.

10. In apparatus of the class described, a body structure, an oven pivoted thereto for swinging movement about a horizontal axis between an idle position and a working position, a latch engaging part incorporated in the body structure, latch means carried by the oven and cooperating with said latch engaging part when the oven is in working position thereby to positively hold the oven in said position, a door pivoted to the oven, a detent for holding said door closed when the oven is in any but working position, and operative connections between the aforesaid latch means and said detent for actuating the detent to release the door when said latch means is in effective position.

11. In apparatus of the class described, a body structure including laterally spaced apart substantially vertical walls, an oven pivotally supported in the space between the walls on an axis normal to said walls and swingable between an idle position and a working position, parts carried by and movable with the oven and located remote from said axis and adjacent the sides and bottom of the oven, and rollers carried by said parts and projecting beyond the planes of the sides of the oven and bearing on said walls, the axes of said rollers being substantially radial to the beforementioned axis.

12. In apparatus of the class described, a body structure including opposed substantially parallel walls that are spaced apart in a lateral direction, an oven movably supported in the space between said walls and shiftable between an idle position and a working position, a latch engaging part incorporated in the body structure latch means carried by the oven for cooperation with said part for holding the oven in substantially fixed relation to said structure when the oven is in working position, spring means urging the latch means toward holding position, a roller incorporated in the latch means and bearing on one of said walls when the oven is in any but working position, and a second roller carried by the oven and bearing on the opposite one of said walls.

13. In apparatus of the class described, a body structure, a shiftable oven pivotally supported thereby for swinging movement between an idle position and a working position, said oven having a hinged door, a detent for holding the door closed when the oven is in any but working position, an obstructer for preventing the detent from assuming door-holding position when the door is not fully closed, the door when closed engaging the obstructer and retaining it in ineffective position, and means tending to release the detent when the oven is in working position.

14. In apparatus of the class described, a body structure, a shiftable oven pivotally supported thereby for swinging movement between an idle position and a working position, said oven having a hinged door, a detent for holding the door closed when the oven is in any but working position, an obstructer for preventing the detent from assuming door-holding position when the door is not fully closed, the door when closed engaging the obstructer and retaining it in ineffective position, a latch engaging part incorporated in the body structure, latch means carried by the oven and cooperating with said part for holding the oven in fixed relation to said structure when the oven is in working position, and operative connections between the detent and said latch means whereby the detent is rendered ineffective when the latch means assumes oven-holding position.

15. In apparatus of the class described, a body structure, a shiftable oven pivotally supported thereby for swinging movement between an idle position and a working position, said oven having a hinged door, a detent for holding the door closed when the oven is in any but working position, a latch engaging part incorporated in the body structure latch means carried by the oven and cooperating with said part for holding the oven in fixed relation to the body structure when the oven is in working position, and a connecting rod providing operative connections between the detent and said latch means whereby the detent is rendered ineffective when the latch means assumes oven-holding position.

16. The combination and arrangement of parts defined by claim 15, wherein said operative connections are adjustable to vary the relationship between the detent and said latch means.

References Cited in the file of this patent

UNITED STATES PATENTS

| | | |
|---|---|---|
| 693,403 | Keffer | Feb. 18, 1902 |
| 998,208 | Scrote | July 18, 1911 |
| 1,354,013 | Baker | Sept. 22, 1920 |
| 2,076,587 | Parsons | Apr. 13, 1937 |
| 2,124,349 | Herbster | July 19, 1938 |
| 2,207,307 | Teller et al. | July 9, 1940 |
| 2,210,361 | Davis et al. | Aug. 6, 1940 |
| 2,247,178 | Schulz | June 24, 1941 |
| 2,314,248 | Rutledge | Mar. 16, 1943 |
| 2,422,450 | Van Daam | June 17, 1947 |
| 2,442,451 | Albin | June 1, 1948 |
| 2,447,364 | Renshaw | Aug. 17, 1948 |
| 2,534,953 | Curry | Dec. 19, 1950 |
| 2,548,034 | Major | Apr. 10, 1951 |